United States Patent [19]

Farrell, Sr. et al.

[11] 4,338,840

[45] Jul. 13, 1982

[54] TIRE CUTTING MACHINE

[76] Inventors: Warren M. Farrell, Sr., 308 S. Ave. A; Warren M. Farrell, Jr., Rte. 4, Box 69, both of Elgin, Tex. 78621

[21] Appl. No.: 185,568

[22] Filed: Sep. 9, 1980

[51] Int. Cl.[3] ........................ B26D 1/09; B26D 5/12; B29H 19/02

[52] U.S. Cl. ........................................ 83/622; 83/636; 83/639; 83/923; 83/925 R; 83/928

[58] Field of Search ............. 83/622, 620, 923, 925 R, 83/928, 636, 639; 241/101.4

[56] References Cited

U.S. PATENT DOCUMENTS

| | | | |
|---|---|---|---|
| 1,943,113 | 1/1934 | Daum | 83/620 |
| 2,297,177 | 9/1942 | Tiffany | 83/620 |
| 3,039,343 | 6/1962 | Richards | 83/622 X |
| 3,304,823 | 2/1967 | Nowak | 83/622 X |
| 3,911,772 | 10/1975 | Kisielewski | 83/923 X |
| 3,922,942 | 12/1975 | Fawcett et al. | 83/923 X |
| 3,958,482 | 5/1976 | Claesson | 83/620 X |

*Primary Examiner*—Frank T. Yost

*Attorney, Agent, or Firm*—Arnold, White & Durkee

[57] ABSTRACT

Apparatus for cutting a tire into segmented pieces utilizes an even multiple of pairs of shear-cutting blades actuated by a hydraulic cylinder ram. The pairs of blades are arranged in radial symmetry, and each pair of blades comprises an upper blade and a lower blade, both of which have a cutting edge defined thereon, such that each pair of blades operates by action of opposed cutting edges. The lower blade of each pair is affixed to a frame, which may be trailer-mounted for mobility. The upper blade of each pair is affixed to a carriage movable on a track secured to the frame, and oriented with the cutting edge disposed at an acute angle relative to the cutting edge of the lower blade. Diametrically opposing upper blades are disposed at corresponding angles, and adjacent upper blades are disposed at different angles from one to the other. Thus, diametrically opposing pairs of blades function to simultaneously engage a tire for cutting and adjacent pairs of blades operate to sequentially engage the tire for cutting. As a result, less force is required to cut an ordinary automobile tire, or a larger tire may be cut with the apparatus.

3 Claims, 6 Drawing Figures

TIRE CUTTING MACHINE

BACKGROUND OF THE INVENTION

The present invention relates to tire-scrapping machinery; and more particularly, it relates to apparatus for cutting rubber tires into segmented pieces for disposal.

One of the major problems in solid waste disposal is the handling of rubber tires. In every major metropolitan area of the United States, there are literally tens of thousands of old tires to be disposed of every month. In the past, disposal by burying and burning has been relied upon. However, because of the air pollution created by the disposal of old tires by burning, laws have been effected which place strict regulations on this manner of disposal. Also, strict regulations now control the burying of old tires in landfills; there is now the requirement that old tires be cut into pieces before burying to prevent tires from working their way to the surface at the landfill.

Heretofore, a number of proposals for the disposal of rubber tires by dismemberment have been made. Each, however, has involved the shredding of discarded tire carcasses into fragmented pieces. Representative of such rubber tire shredding apparatus is that disclosed in U.S. Pat. No. 4,180,004 assigned to Tire-Gator, Inc. of Houston, Tex. Another similar piece of equipment for shredding tires is the *TIRE SCRAPPER MACHINE* which has been offered by Alternative Energy Company. The structure of both machines comprises interengaging, rotary feeder-cutter wheels mounted on counter rotating shafts, which pull a rubber tire through a feed path between the wheels and simultaneously shred the tire with cutting implements.

SUMMARY OF THE INVENTION

In accordance with the present invention, there is provided a machine for cutting rubber tires, such as automobile and truck tires. Specifically, the present invention provides tire cutting apparatus which cuts a rubber tire carcass into segmented pieces.

The tire cutting apparatus includes a frame defining a tire-cutting area. An elongate track is secured in fixed relation to the frame with a carriage mounted thereon for reciprocating movement. At least first and second pairs, and preferably an even multiple of pairs, for example six pairs, of shear-cutting blades are included, for cutting a tire placed in the tire-cutting area of the frame. One blade of each pair is affixed to the movable carriage, with the other blade of the pair being affixed to the frame. Each blade has a cutting edge defined thereon, such that each pair of shear-cutting blades operates by action of opposed cutting edges to cut through a tire.

The blades of each pair of blades are disposed at an acute angle with respect to one another, with the angle of relative disposition of the first pair of blades being different from the angle of relative disposition of the second pair of blades, such that the first pair of blades will engage a tire for cutting before the second pair of blades so engages the tire.

In a tire cutting machine in accordance with the present invention and utilizing an even multiple of pairs of shear-cutting blades greater than two, the pairs of blades are preferably arranged in radial symmetry within the frame. The upper blade of each pair is affixed to the movable carriage and oriented with the cutting edge disposed at an acute angle relative to horizontal, with diametrically opposing upper blades being disposed at corresponding angles and adjacent upper blades being disposed at different angles from one another. In operation, diametrically opposed pairs of shear-cutting blades simultaneously engage a tire for cutting and adjacent pairs of shear-cutting blades sequentially engage the tire for cutting.

Some means for moving the carriage on the elongate guide track to effect cutting action of the pairs of shear-cutting blades is also included. Suitably, the carriage moving means comprises a hydraulic cylinder ram connected between the frame and the carriage. However, other types of force-drive systems could be equally effective. For example, an electric or pneumatically operated drive motor linked to the carriage would effect the same function and be equivalent to a hydraulically actuated carriage moving means.

The frame may be either vertically or horizontally oriented. Preferably, however, the frame is vertically oriented such that the carriage moves along a vertical axis of movement. In such an embodiment, the blades affixed to the frame may be referred to as the "lower" blades, and the blades mounted to the moving carriage are "upper" blades. A tire to be cut may be placed on its side in the tire-cutting area of the frame and supported upon the lower blades for cutting.

In other aspects of the invention, the tire cutting machine may be mounted on a trailer for enhanced mobility from one job site to another. In addition, the tire cutting machine may be provided with an infeed conveyor for depositing tires one at a time into the tire-cutting area of the frame, with an outfeed conveyor being provided for receiving thereon cut pieces of tire and conveying the same away to a point of discharge.

BRIEF DESCRIPTION OF THE DRAWINGS

A more complete appreciation of the invention and many of the attendant features thereof will become better understood by reference to the detailed description herein when considered in connection with the accompanying drawings wherein.

DESCRIPTION OF THE ILLUSTRATED EMBODIMENT

Figure 1:
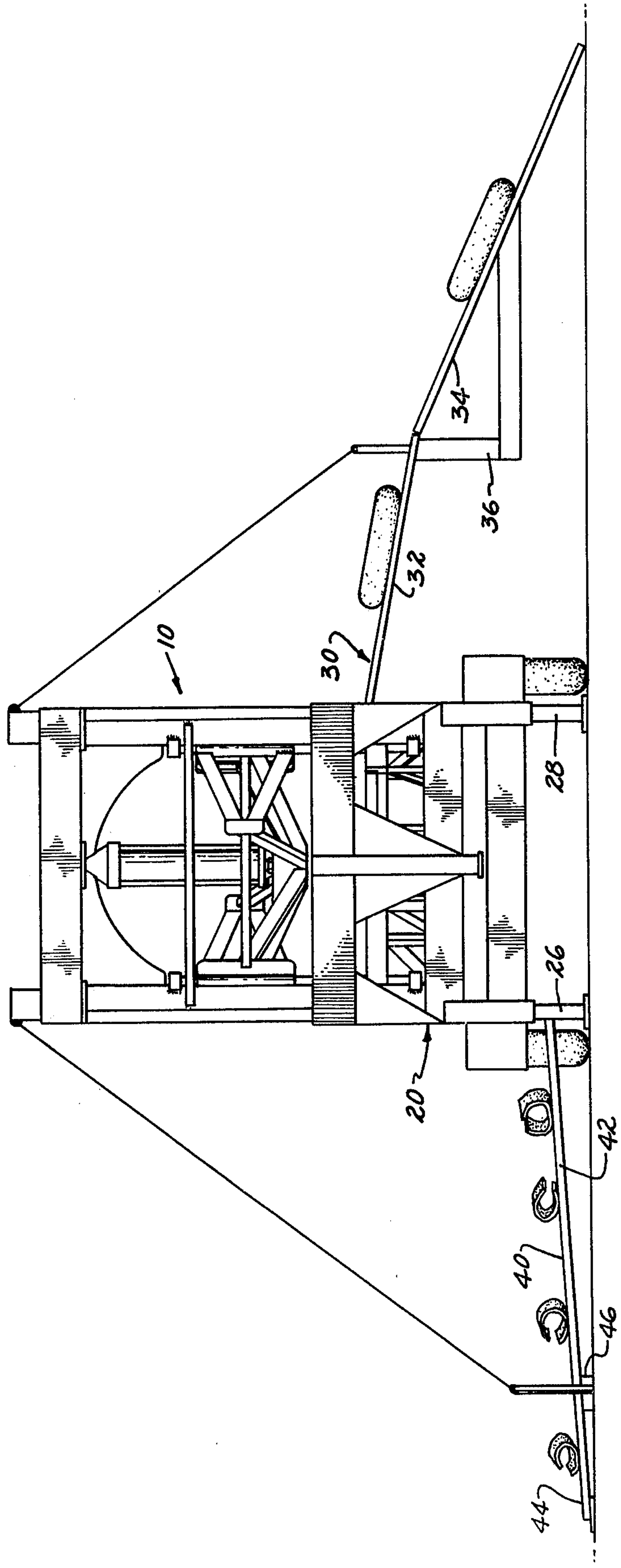
FIG. 1 is a frontal view of one embodiment of tire cutting apparatus in accordance with the present invention, which shows the apparatus mounted on a trailer and having infeed and outfeed conveyors acting in cooperation with the tire-cutting operation conducted by the apparatus.
Figure 2:
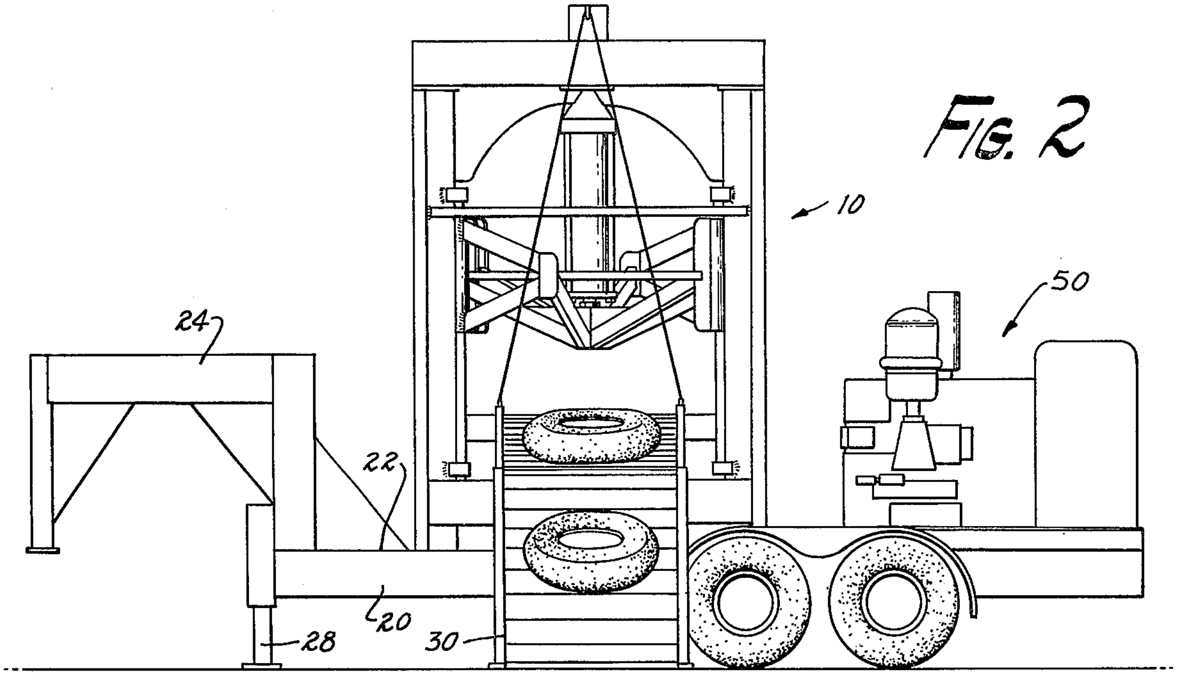
FIG. 2 is a side view of the trailer-mounted apparatus shown in FIG. 1.

Referring now to the drawings, and particularly to FIGS. 1 and 2, there is shown one embodiment of tire cutting apparatus in accordance with the present invention. In the embodiment shown, tire cutting apparatus 10 is mounted on a trailer 20 providing for mobility of the apparatus from one location to another. Suitably, trailer 20 is a tandem axle trailer as shown having a flat surface 22 upon which tire cutting apparatus 10 is mounted. Trailer 20 is suitably provided with a "gooseneck" hitch 24 for towing behind a motor vehicle, such as a truck. Trailer 20 is also provided with support stabilizers 26, 28 to support the forward end of the trailer when detached from the towing vehicle.

To facilitate an automatic mode of operation for tire cutting apparatus 10, an infeed conveyor 30 and an outfeed conveyor 40 are provided. Infeed conveyor 30 receives thereon tires to be cut and conveys the same to tire cutting apparatus 10. As shown in the drawings, infeed conveyor 30 transports one tire at a time to the tire cutting apparatus. Each tire conveyed by infeed conveyor 30 is disposed on its side. Infeed conveyor 30 suitably comprises first and second interconnected conveyor sections 32, 34, which are braced by support structure 36. Infeed conveyor 30 is suitably a chain driven conveyor having a plurality of rollers or an endless conveyor belt. As shown, tires placed on conveyor section 34 are carried to an elevated position for delivery into tire cutting apparatus 10.

Outfeed conveyor 40 extends laterally from a point beneath tire cutting apparatus 10 and transports the segmented pieces of cut tires which drop out the bottom of tire cutting apparatus 10. Outfeed conveyor 40 is of a construction similar to that of infeed conveyor 30, and includes first and second interconnected conveyor sections 42, 44, which are braced by support structure 46.

Both infeed conveyor 30 and outfeed conveyor 40 may be driven by an electric motor or gasoline engine. For powering not only the infeed and outfeed conveyors, but also for powering the hydraulic system of the tire cutting apparatus, a gasoline or diesel engine powered generator unit 50 is installed on the aft portion of trailer 20. A diesel engine-driven electric generator with electric motor driven conveyors is preferred; however, equivalent equipment such as an engine-driven air compressor and pneumatical motor driven conveyors may be suitably utilized.

Figure 3:
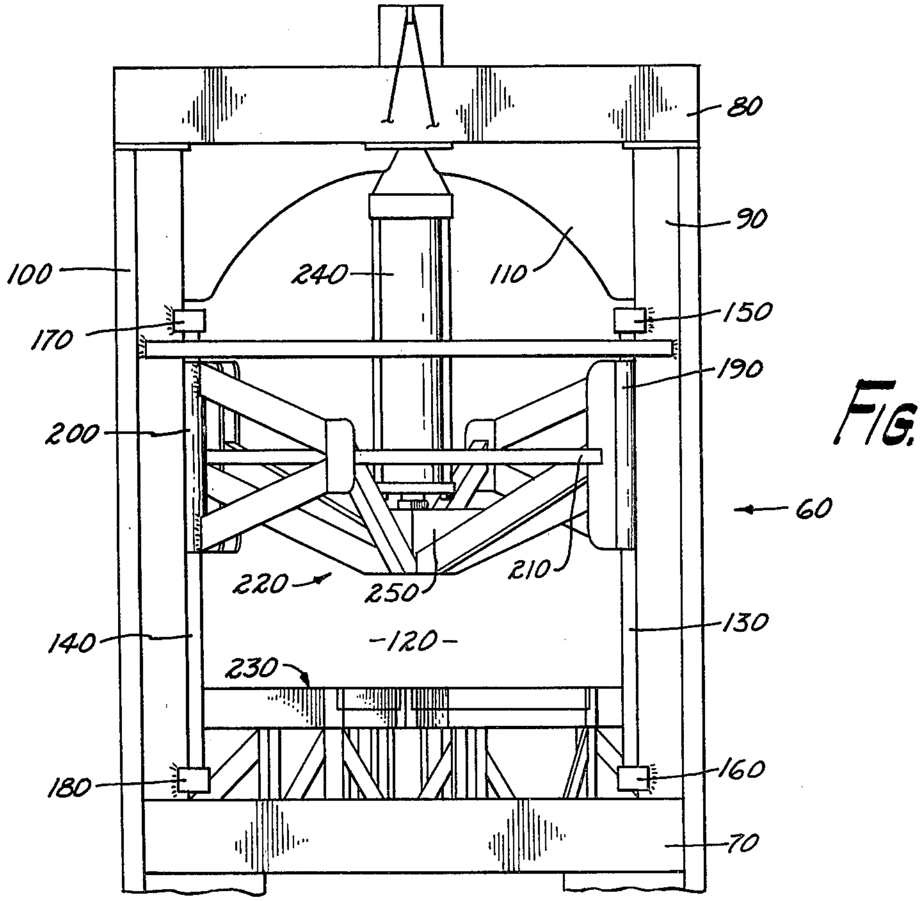
FIG. 3 is a close-up side view of the tire cutting apparatus shown in FIG. 1.

Referring now to FIG. 3, there is shown close-up the embodiment of the tire cutting apparatus 10. In this embodiment, tire cutting apparatus 10 has an upright-standing frame 60 adapted to be placed on and supported by a relatively flat, horizontal surface. In the embodiment shown, frame 60 is a rectangular box frame having a square base 70 and a square top support structure 80. Frame 60 further includes a plurality of vertical support columns extending between base structure 70 and top support structure 80. A vertical support column extends between corresponding corners of base 70 and top structure 80; accordingly, there are four support columns, of which only columns 90 and 100 are in view. Top support structure 80 and base 70 are of a square configuration constructed of four side members connected end-to-end. Both base 70 and top support structure 80 preferably include cross brace members (not in view) which extend diagonally between opposing corners of the structure. Further details and suitable dimensions for frame 60 may be obtained by reference to co-pending Application Ser. No. 185569, entitled *TIRE CUTTING MACHINE* in the names of Warren M. Farrell, Sr. and Warren M. Farrell, Jr. as inventors, filed concurrently with the filing of this application. The disclosure of that application is hereby incorporated by reference.

Continuing with the description of FIG. 3, frame 60 may further include web support plates 110. Each plate is attached, for example by welding, along one side to a vertical support column and along the adjacent side to a segment of one of the diagonal cross braces of top support structure 80.

Frame 60 defines a tire-cutting area 120 accessible from a direction transverse to the longitudinal axis of the frame, for placement therein of a tire to be cut. As used herein, "tire-cutting area" refers to the area 120 inside the support columns.

Tire cutting apparatus 10 further includes an elongate guide track secured in fixed relation to the frame. This structure in the embodiment being described comprises four vertical rods, of which only rods 130 and 140 are in view. The upper and lower ends of each rod are fixed in relation to frame 60 by attachment to one of the vertical support columns. For example, rod 130 is attached to column 90, and rod 140 is attached to column 100. Attachment of the ends of the rods may be by means of a welded support bracket extending inwardly of the frame from the vertical support column. For example, rod 130 is secured by upper bracket 150 and lower bracket 160. Similarly, rod 140 is secured to vertical support column 100 by brackets 170 and 180. Suitable dimensions for the rods of the elongate guide track may be obtained from the referenced co-pending application.

A carriage is mounted on the elongate guide track for reciprocating movement thereon along an axis of movement. The carriage includes a plurality of sleeves, each mounted for sliding movement on one of the elongate guide track rods. For example, sleeve 190 slides on rod 130, and sleeve 200 slides along rod 140. The sleeves are interconnected by cross brace members, of which only member 210 is in view.

The tire cutting apparatus embodiment of FIG. 3 further includes six pairs of shear-cutting blades. One blade of each pair is affixed to the movable carriage and the other blade of each pair is affixed to the frame. Accordingly, there are "upper" blades 220 and cooperating "lower" blades 230. Each of the upper and lower blades has a cutting edge defined thereon, such that each pair of blades operates by action of opposed cutting edges to cut a tire placed in the tire-cutting area of the frame.

As shown in FIG. 3, the blades of each pair are disposed at an acute angle with respect to one another. In the embodiment shown, the lower blades are affixed to the frame and disposed with the cutting edge extending substantially horizontal. The upper blade of each pair is oriented with the cutting edge extending at an acute angle relative to horizontal.

Means for moving the carriage on the elongate track to effect cutting action of the pairs of blades is also included in the form of hydraulic cylinder ram 240 which is interconnected between top support structure 80 and connector member 250 to which the innermost end of each upper blade connects. Extension and retraction of the hydraulic cylinder ram causes the carriage to move vertically up and down. As will be appreciated, downward movement of the upper blades relative to the lower blades will effect the cutting of a tire carcass by "sissor-like" cutting.

Figure 4:
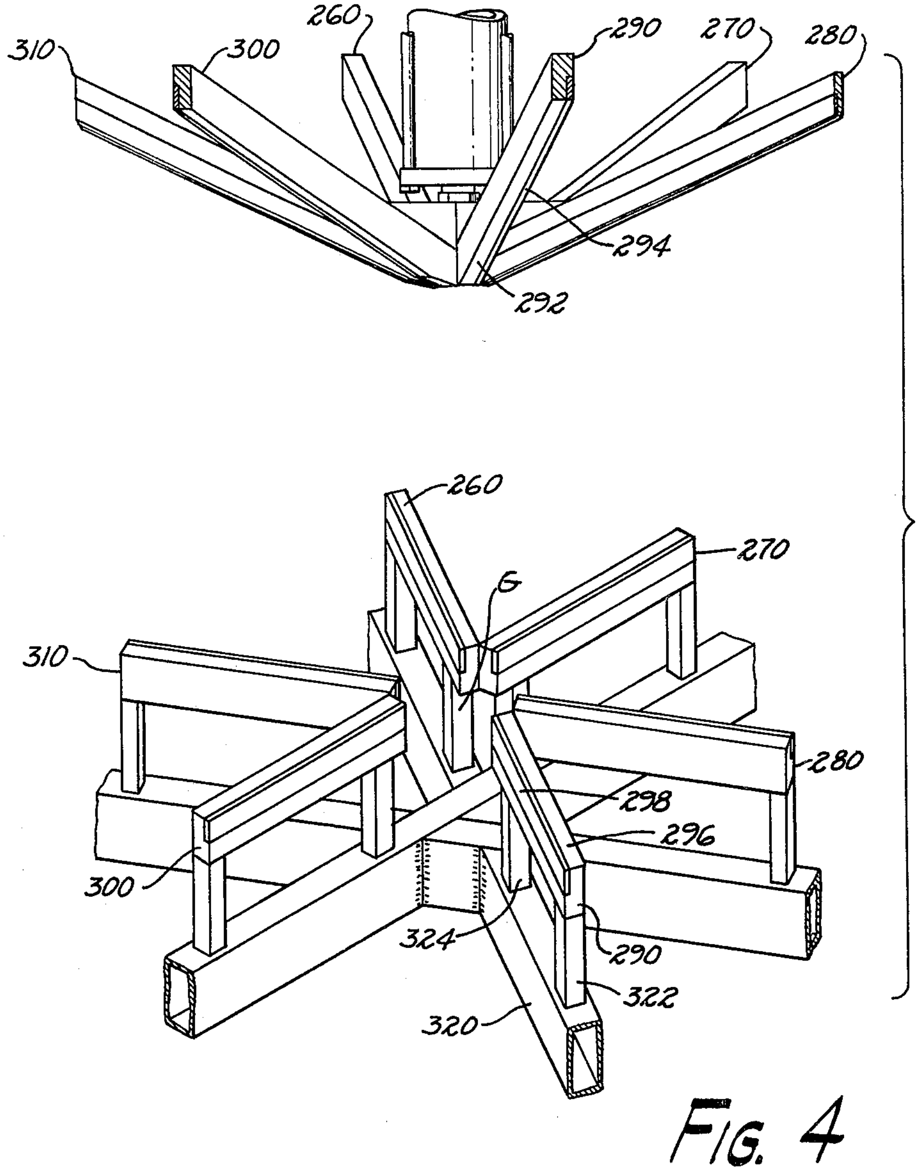
FIG. 4 is a perspective view of the shear-cutting blades utilized in the tire cutting apparatus shown in FIG. 3.

Referring next to FIG. 4, there is presented a close-up perspective view of the upper and lower blades of the tire cutting apparatus 10 shown in FIG. 3. In FIG. 4, upper and lower blades of a pair of blades have been designated with an identical reference numeral. The six pairs of blades which are shown are designated as pairs 260, 270, 280, 290, 300 and 310.

Considering first the upper blade of pair 290, which is taken as a representative one of the upper blades, the blade includes a metal mounting bar 292 and hard-tempered steel insert 294 connected thereto by such means as bolting or the like.

The illustration of the lower blades in FIG. 4 best shows that the pairs of shear-cutting blades in tire cutting apparatus 10 are arranged in radial symmetry. With there being six pairs of blades in the embodiment being described, there will be approximately 60° of separation between adjacent pairs of blades. As will be appreciated, tire cutting apparatus 10 will cut a tire into six segmented pieces of approximately equal size.

Considering the lower blade of pair 290 as a representative one of the lower blades, each lower blade is seen to comprise a mounting member 296 which is attached to a diagonal cross bracing member 320 that forms a part of the base 70 portion of frame 60. Blade mounting member 296 is attached to cross brace 320 by vertical support stanchions 322, 324, each of which supports one end of blade mounting member 296. A hard-tempered steel insert 298 is attached to mounting member 296, for example, by bolting or other equivalent means of attachment.

The steel cutting edge inserts for the upper and lower blades may suitably be D-2 tool steel available from Medallion Steel Co. in Cleveland, Ohio.

As shown in FIG. 4, the lower blades are mounted with the inward ends of lower blades 260 and 270 close together, the inward ends of blades 280 and 290 close together, and with the inward ends of blades 300 and 310 close together. There is, however, a wide separation gap G between the inward ends of the diametrically opposing lower blades. The open space, or gap, is necessary to accommodate passage of the interconnected, inward ends of the upper blades during a cutting operation.

The blade inserts for the upper and lower blades of each pair are adjusted for alignment such that the upper and lower blades pass by one another with a very close tolerance clearance. A tolerance of 0.002 inch is recommended.

As further indicated in FIG. 4, the lower blades of each pair are preferably oriented horizontally; that is, the lower blades are disposed in a plane transverse to the axis of movement of the carriage. Accordingly, a tire delivered into the tire-cutting area within the frame by the infeed conveyor is laid on its side atop the lower blades for cutting. The upper blades, which are mounted on the carriage, are disposed at an acute angle relative to the lower blades, and therefore extend at an acute angle relative to horizontal.

As will be appreciated, each pair of blades operates by action of opposed cutting edges, and with the "skewed" or relative orientation of the upper and lower blades of each pair, a "scissor-like" cutting action is produced.

Figure 5:
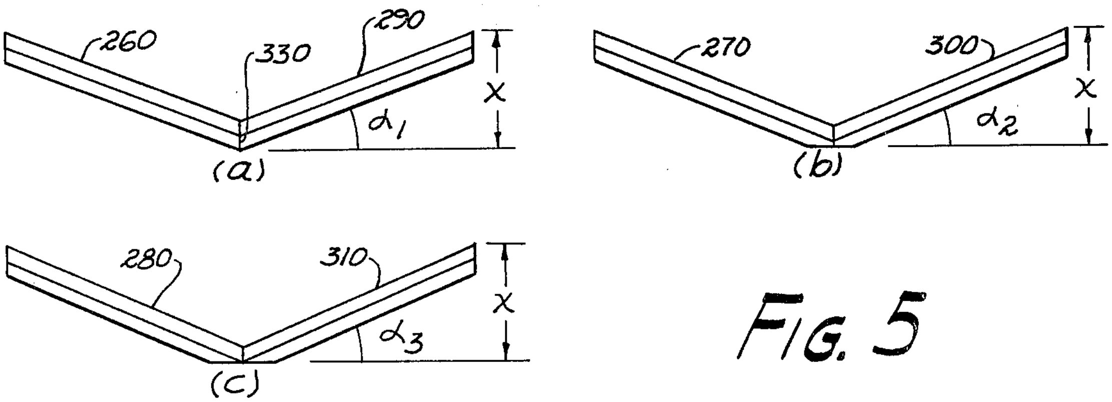
FIGS. 5(*a*) through (*b*) are schematic illustrations of the upper blades shown in FIG. 4, depicting the manner of construction which provides sequential cutting action of the pairs of blades.

Referring now to FIGS. 5(*a*) through 5(*c*), further definition of the upper blades arrangement will now be set forth. It is a feature of the present invention to provide for "staggered" or sequential cutting of a tire. That is, not all of the pairs of blades engage the tire at the same time for cutting. This function is provided by varying the angle of disposition between the upper and lower blade cutting edges from one pair of blades to another. In the embodiment shown and being described, wherein the lower blades are horizontal, varying the angle of an upper blade cutting edge relative to horizontal effects a variation in the angle of disposition of the upper blade with respect to the cutting edge of the lower blade.

In tire cutting apparatus having an even multiple of pairs of shear-cutting blades, such as the embodiment being described herein, it has been found suitable to dispose diametrically opposing upper blades at corresponding angles and dispose adjacent upper blades at different angles from one another. In such an arrangement, diametrically opposed pairs of blades will simultaneously engage a tire for cutting, with adjacent pairs of blades sequentially engaging the tire for cutting depending upon the relative angles of blade disposition.

In the embodiment being described, the angle of disposition of the upper blades is achieved by altering the inward ends of certain of the upper blades. Unaltered, the inward ends of the upper blades would intersect and form an apex. This is illustrated in FIG. 5(*a*) in which the unaltered upper blades of pairs 260 and 290 are shown intersecting to form an apex 330. These blades extend upwardly at an angle $\alpha_1$ to a vertical height X. In order to "stagger" the adjacent blades (i.e., vary the relative angle of disposition), the inward ends of diametrically opposed upper blades are altered by trimming-back the apex formed by the blades and dropping the ends lower. As shown in FIGS. 5(*b*) and 5(*c*), such trimming of the apex results in the angle of orientation of the blades being increased. By alteration of the ends of diametrically opposing upper blades 270 and 300, so as to trim back the apex of their intersection to the extent shown, the blades become oriented at an angle $\alpha_2$ which is greater than the angle $\alpha_1$ of upper blades 260 and 290. Similarly, if the inward ends of upper blades 280 and 310 are altered so as to trim back the apex of their interconnection to a greater extent than that for blades 270 and 300, and dropped lower, upper blades 280 and 310 will become oriented at an angle $\alpha_3$ which is even greater than angle $\alpha_2$. Suitable angles of inclination of $\alpha_1=21°$, $\alpha_2=23°$, and $\alpha_3=25°$ have been found suitable in the cutting of conventional automobile and truck tires.

Figure 6:
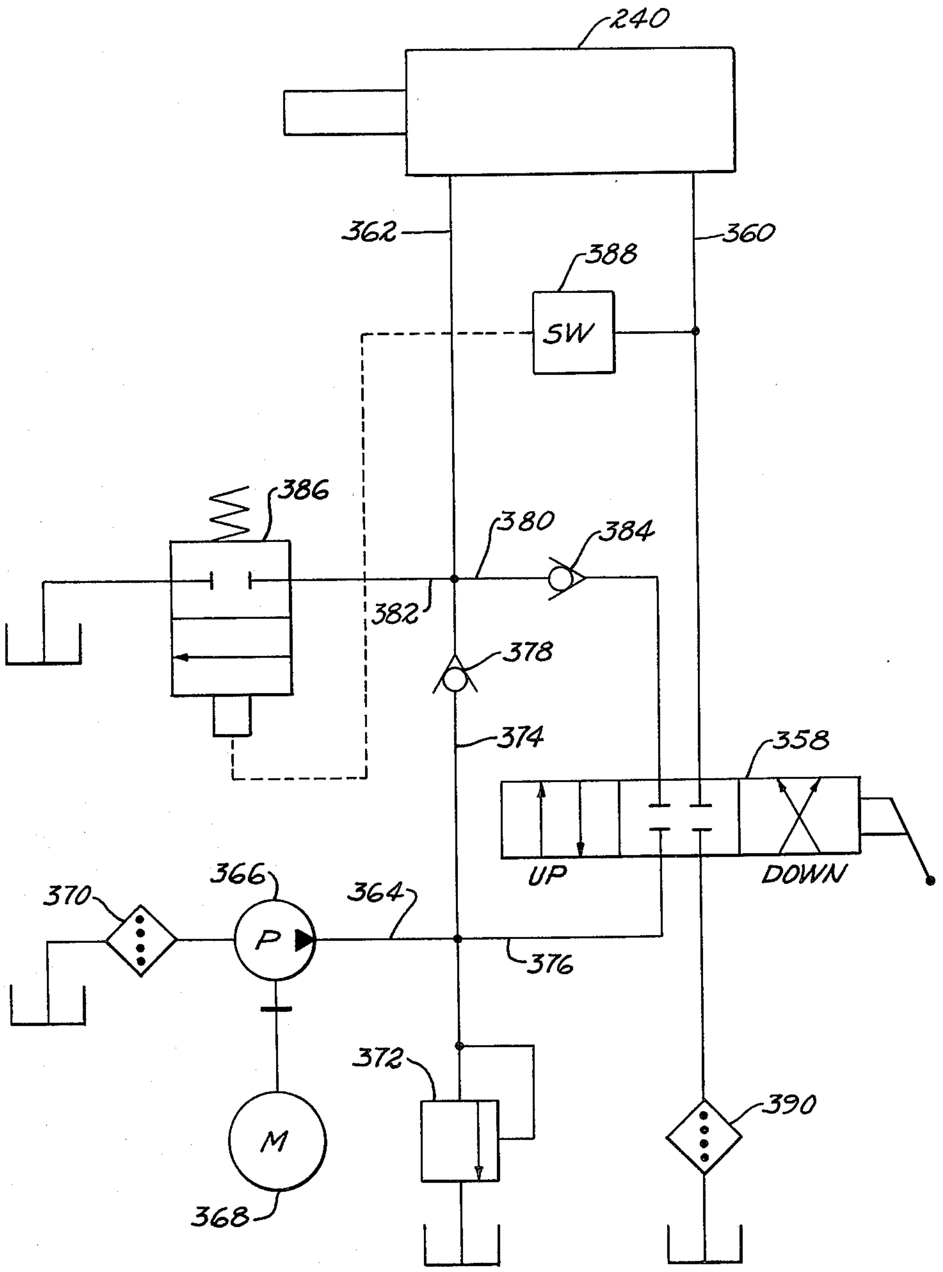
FIG. 6 is a schematic diagram of a hydraulic system for effecting controlled movement of the carriage in the apparatus shown in FIG. 3.

Referring to FIG. 6, there is presented a schematic diagram of a suitable hydraulic system for use in the tire cutting apparatus of FIG. 3. To selectively control hydraulic cylinder ram 240, a three position valve 358 is provided to route hydraulic fluid through two flow lines 360, 362 which lead to hydraulic cylinder 240. The direction of flow through lines 360, 362, establish the direction of travel of the hydraulic cylinder ram. Manual valve 358 has the three positions of UP, NEUTRAL, and DOWN.

Hydraulic fluid from a reservoir tank is supplied through a main flow line 364 by pump 366 which is driven by motor 368. Fluid drawn from the reservoir tank is filtered by filter 370. A pressure relief valve 372 "bleeds-off" excess pressure in flow line 364. Main flow line 364 splits into first and second secondary flow lines 374, 376. Line 374 has connected therein a one-way ball-check valve 378 which interconnects with flow lines 362, 380 and 382. Line 376 is connected directly to valve 358.

Flow line 380 includes a ball-check valve 384 and interconnects to valve 358. Flow line 382 includes a solenoid operated safety valve 386, which bleeds-off hydraulic fluid to the reservoir tank when pressure sensing switch 388 detects excessive pressure in flow line 360.

In operation of the hydraulic control system, when valve 358 is actuated to the UP position, pressurized hydraulic fluid being supplied by pump 366 is driven through line 376, valve 358, and check valve 384 to line 362. Hydraulic fluid pressure in line 362 causes the hydraulic cylinder ram to retract. Exhaust flow from cylinder 240 is through line 360, valve 358, and filter 390 back to the reservoir tank.

When valve 358 is actuated to the DOWN position, pressurized hydraulic fluid from pump 366 flows through line 376 to valve 358 where it is routed into flow line 360. Pressurized hydraulic fluid entering cylinder 240 causes extension of the hydraulic ram. Exhausting hydraulic fluid through line 362 is sent through check valve 378 for return back to the reservoir tank.

Suitable devices for implementing the primary components of the hydraulic system of FIG. 6 may be as follows:

Cylinder 240—Ortman Miller 3THG (8" bore; 27" stroke)
Valve 358—Rexroth 4WMM22G 30/5
Pump 366—Hydreco 22 PR 220546
Motor 368—Detroit Diesel 371

Suitably, effective cutting action by the blades is produced by use of carriage moving means developing 150,000 lbs. of force.

The foregoing description of the invention has been directed to a particular preferred embodiment for purposes of explanation and illustration. It will be apparent, however, to those skilled in this art that many modifications and changes in the apparatus may be made without departing from the essence of the invention. Quite clearly, the tire cutting apparatus of the present invention may be adapted for horizontal disposition rather than the vertical orientation shown. Additionally, the elongated track may be provided by means other than the rod and sliding sleeves described. Moreover, the carriage moving means may be types of equipment other than hydraulic cylinder equipment. For example, the carriage moving means may comprise an electrical or pneumatically driven motor interconnected to the carriage by a mechanism such as a drive chain and sprockets. It is the Applicants' intention in the following claims to cover all such equivalent modifications and variations as fall within the scope of the invention.

What is claimed is:

1. Apparatus for cutting tires, which comprises:
a frame defining a tire-cutting area;
an elongate guide track secured in fixed relation to the frame;
a carriage mounted on the elongate guide track for reciprocating movement thereon along an axis of movement;
first and second pairs of shear-cutting blades, one blade of each pair being affixed to the movable carriage and the other blade of each pair being fixed relative to the frame, each pair of blades operating by action of opposed cutting edges to cut a tire placed in the tire-cutting area of the frame,
the blades of each pair being disposed at an acute angle with respect to one another,
the angle of relative disposition of the first pair of blades being different from the angle of relative disposition of the second pair of blades, such that the first pair of blades will engage a tire for cutting before the second pair of blades so engages the tire; and
means for moving the carriage on the elongate guide track to effect cutting action of the pairs of blades.

2. The apparatus of claim 1, wherein said carriage moving means comprises:
a hydraulic cylinder ram connected between the frame and the carriage; and
a hydraulic control system for selective operation of the hydraulic cylinder ram.

3. Apparatus for cutting tires, which comprises:
an upright-standing frame defining a tire-cutting area;
an elongate guide track secured to the frame;
a carriage mounted on the elongate guide track for reciprocating vertical movement thereon;
an even numbered multiple of pairs of shear-cutting blades, said pairs of blades being arranged in radial symmetry within the frame around a vertical central axis,
each pair of blades comprising an upper blade and a lower blade, with both blades having a cutting edge,
the lower blade of each pair being fixed relative to the frame and oriented with the cutting edge extending in a substantially horizontal plane,
the upper blade of each pair being affixed to the movable carriage and oriented with the cutting edge disposed at an acute angle relative to horizontal, with diametrically opposing upper blades being disposed at corresponding angles and adjacent upper blades being disposed at different angles from one another, such that diametrically opposed pairs of blades will simultaneously engage a tire for cutting and adjacent pairs of blades will sequentially engage the tire for cutting; and
means for moving the carriage on the elongate track to effect cutting action of the pairs of blades.

* * * * *